(12) United States Patent
VanBeek et al.

(10) Patent No.: US 12,184,629 B2
(45) Date of Patent: Dec. 31, 2024

(54) SECURE CONTENT ACCESS ACROSS USER ACCOUNTS

(71) Applicant: DISNEY ENTERPRISES, INC., Burbank, CA (US)

(72) Inventors: Eric S. VanBeek, Artesia, CA (US); Adeel S. Fahimullah, Los Angeles, CA (US); Drew H. Kutilek, Los Angeles, CA (US); Mohamad H. Monibi, Glendale, CA (US); Mark A. Shurgot, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 410 days.

(21) Appl. No.: 16/818,594

(22) Filed: Mar. 13, 2020

(65) Prior Publication Data
US 2021/0288947 A1   Sep. 16, 2021

(51) Int. Cl.
*H04L 29/06* (2006.01)
*G06F 16/23* (2019.01)
(Continued)

(52) U.S. Cl.
CPC .......... *H04L 63/08* (2013.01); *G06F 16/2379* (2019.01); *G06F 16/9566* (2019.01); *G06Q 20/123* (2013.01); *G06Q 20/127* (2013.01)

(58) Field of Classification Search
CPC . H04L 63/08; H04L 63/0807; G06F 16/2379; G06F 16/9566; G06Q 20/123;
(Continued)

(56) References Cited

U.S. PATENT DOCUMENTS 8,468,070 B1 * 6/2013 Scofield ................. H04L 65/60
705/34
8,571,994 B2    10/2013 Robert et al.
(Continued)

FOREIGN PATENT DOCUMENTS

WO   2013169478 A1   11/2013

OTHER PUBLICATIONS

Finder Website, Broughall, Nick et al., "Google Play Movies & TV | The Android alternative to iTunes entertainment", https://www.finder.com/in/internet-tv/google-play-movies-tv (Accessed Jan. 15, 2020), May 17, 2019, 4 pages.
(Continued)

*Primary Examiner* — Nicholas P Celani
*Assistant Examiner* — Wuji Chen
(74) *Attorney, Agent, or Firm* — Dorsey & Whitney LLP

(57) ABSTRACT

The present disclosure relates generally to systems and methods to enable users to access content authorized to other users. A method for accessing content may include receiving an access activation request from a primary device or a primary user account corresponding to a content item accessible by the primary user account, generating an access identifier corresponding to the content item, where the access identifier identifies the content item and includes access information, receiving an access request including the access identifier from a secondary device or a second user account, determining that the access identifier is valid, and delivering the content item to the secondary device.

18 Claims, 6 Drawing Sheets

(51) Int. Cl.
*G06F 16/955* (2019.01)
*G06Q 20/12* (2012.01)
*H04L 9/40* (2022.01)

(58) Field of Classification Search
CPC ... G06Q 20/127; G06Q 20/322; G06Q 20/407
See application file for complete search history.

(56) References Cited

U.S. PATENT DOCUMENTS

| | | | |
|---|---|---|---|
| 8,577,000 B1* | 11/2013 | Brown | H04M 1/72439 379/88.13 |
| 8,584,259 B2* | 11/2013 | Le Chevalier | H04L 63/108 726/28 |
| 8,782,136 B1 | 7/2014 | Ho et al. | |
| 9,268,920 B1 | 2/2016 | Butler et al. | |
| 9,378,386 B1 | 6/2016 | Saylor et al. | |
| 9,805,207 B1 | 10/2017 | Nijim et al. | |
| 9,836,619 B1* | 12/2017 | Goldston | G06F 21/10 |
| 9,973,822 B2 | 5/2018 | Wong et al. | |
| 10,027,676 B2* | 7/2018 | Tran | H04L 63/104 |
| 10,248,767 B2 | 4/2019 | James et al. | |
| 10,341,735 B2 | 7/2019 | Auxer et al. | |
| 10,387,629 B2 | 8/2019 | Robert et al. | |
| 10,979,228 B1* | 4/2021 | Delgado | H04L 9/0894 |
| 11,157,572 B1* | 10/2021 | Anima | G06F 3/04842 |
| 11,296,942 B1* | 4/2022 | Kabra | H04L 41/0816 |
| 2005/0262186 A1* | 11/2005 | Szeto | G06Q 10/107 709/203 |
| 2006/0206486 A1* | 9/2006 | Strickland | G06Q 30/02 707/999.009 |
| 2007/0076872 A1* | 4/2007 | Juneau | H04N 21/2543 380/202 |
| 2007/0124201 A1* | 5/2007 | Hu | G06F 21/10 705/14.2 |
| 2007/0226368 A1* | 9/2007 | Strickland | H04L 63/10 705/26.1 |
| 2008/0294453 A1* | 11/2008 | Baird-Smith | G06F 21/10 726/28 |
| 2009/0282130 A1 | 11/2009 | Antoniou et al. | |
| 2011/0047629 A1* | 2/2011 | Mitchell | G06Q 30/018 705/317 |
| 2011/0072496 A1 | 3/2011 | Bertin et al. | |
| 2011/0078714 A1 | 3/2011 | Sagayaraj et al. | |
| 2011/0185437 A1* | 7/2011 | Tran | H04N 21/41265 726/28 |
| 2011/0230268 A1* | 9/2011 | Williams | G07F 17/3241 463/42 |
| 2011/0302246 A1* | 12/2011 | Koren | G06Q 10/10 709/204 |
| 2011/0320961 A1* | 12/2011 | Sriraghavan | H04L 67/75 715/753 |
| 2012/0317655 A1* | 12/2012 | Zhang | H04L 9/0833 726/28 |
| 2013/0002489 A1 | 1/2013 | Erad et al. | |
| 2013/0036200 A1* | 2/2013 | Roberts | H04L 65/1093 709/219 |
| 2013/0060616 A1* | 3/2013 | Block | G06Q 30/0601 726/28 |
| 2013/0060661 A1* | 3/2013 | Block | G06Q 30/06 726/28 |
| 2013/0174223 A1 | 7/2013 | Dykeman et al. | |
| 2013/0174273 A1 | 7/2013 | Grab et al. | |
| 2013/0204961 A1 | 8/2013 | Fliam et al. | |
| 2013/0212610 A1* | 8/2013 | Hussain | H04N 21/4784 725/23 |
| 2013/0225081 A1 | 8/2013 | Doss et al. | |
| 2014/0047320 A1* | 2/2014 | Le Chevalier | G06F 40/131 715/234 |
| 2014/0164519 A1* | 6/2014 | Shah | H04L 67/306 709/204 |
| 2014/0164547 A1 | 6/2014 | Fullagar et al. | |
| 2014/0164776 A1* | 6/2014 | Hook | G06F 21/6218 713/171 |
| 2014/0280266 A1* | 9/2014 | Walter | G06F 16/48 707/758 |
| 2014/0282666 A1* | 9/2014 | Comstock | H04N 21/274 725/18 |
| 2015/0127940 A1 | 5/2015 | Polehn et al. | |
| 2015/0147968 A1 | 5/2015 | Friedman et al. | |
| 2015/0201023 A1* | 7/2015 | Kotab | H04L 65/613 709/208 |
| 2015/0310472 A1 | 10/2015 | Davidson et al. | |
| 2015/0312259 A1* | 10/2015 | Alpha | G06F 16/951 707/723 |
| 2016/0006823 A1 | 1/2016 | Strong et al. | |
| 2016/0044090 A1 | 2/2016 | Glickfield et al. | |
| 2016/0044385 A1* | 2/2016 | Kareeson | G06Q 20/1235 725/27 |
| 2016/0063268 A1* | 3/2016 | Cheatham, III | G06F 21/10 726/28 |
| 2016/0119438 A1 | 4/2016 | Abramson et al. | |
| 2016/0162252 A1 | 6/2016 | Di Censo et al. | |
| 2016/0219098 A1 | 7/2016 | Baca et al. | |
| 2016/0261658 A1 | 9/2016 | Taylor et al. | |
| 2017/0019495 A1 | 1/2017 | Bennis et al. | |
| 2018/0032680 A1* | 2/2018 | Chen | G16H 10/60 |
| 2018/0203601 A1* | 7/2018 | Birchfield | G06F 21/31 |
| 2019/0141399 A1 | 5/2019 | Auxer et al. | |
| 2020/0004829 A1* | 1/2020 | Denton | H04L 67/306 |
| 2020/0082061 A1* | 3/2020 | Goldston | G06F 16/61 |
| 2020/0193482 A1* | 6/2020 | Howard | H04M 1/7243 |
| 2021/0073358 A1* | 3/2021 | Goldston | G06F 16/61 |
| 2021/0133790 A1* | 5/2021 | Manning | G06Q 30/0238 |
| 2021/0224362 A1* | 7/2021 | Goldston | G06F 21/10 |
| 2021/0248214 A1* | 8/2021 | Goldston | G06F 16/686 |
| 2021/0279305 A1* | 9/2021 | Goldston | G06Q 20/389 |

OTHER PUBLICATIONS

The Verge Website, Welch, Chris, "How to use Movies Anywhere to stream your film collection on every device", https://www.theverge.com/2017/10/13/16464000/how-to-use-movies-anywhere-app-features (Accessed Jan. 15, 2020), Oct. 13, 2017, 10 pages.

International Search Report and Written Opinion issued in International Patent Application No. PCT/US2021/020582 on Jun. 22, 2021 (9 pages).

* cited by examiner

SECURE CONTENT ACCESS ACROSS USER ACCOUNTS

FIELD

The present disclosure relates generally to systems and method for viewing and accessing content.

BACKGROUND

Many people purchase or otherwise have access to digital content, such as movies, television shows, electronic books, and the like. The digital content may be stored locally on a user's device (e.g., hard drive) or in many instances, is stored on a database and accessible via a network. For example, certain content managers or providers store a copy of a particular content item and stream the content to the user's playback device once the user has provided the proper credentials (e.g., user name and password).

Currently, to access content not authorized for their use, many users will use another user's login credentials in order to access content items licensed to and accessible by another user. This type of credential sharing can generate security risks, prevent proper users from accessing their content (e.g., due to an improper user changing a password), and interferes with content owners' and platforms' abilities to control distribution.

SUMMARY

In one embodiment, a method for accessing content is disclosed. The method includes receiving an access activation request from a primary device corresponding to a content item authorized for use by the primary device, generating an access identifier corresponding to the content item, wherein the access identifier identifies the content item and includes access information, receiving an access request including the access identifier from a secondary device, determining that the access identifier is valid, and providing access to the content item to the secondary device.

In another embodiment, a method for providing access to content is disclosed. The method includes receiving an access activation request for a content item including an access identifier, comparing the access identifier to a database of activate content access transactions to determine that the access identifier is valid, transmitting access information corresponding to the content item and the access identifier, and providing access to the content item based on the access data and the access identifier.

In yet another embodiment, a computer readable medium including instructions that when executed by at least one processor of a computing system cause the computing system to perform a method comprising: receiving an access activation request corresponding to a first user account for a content platform and a content item authorized to the first user account, generating an access key corresponding to the content item where the access key identifies the content item and is based on the first user account having authorized access to the content item, receiving an access request including the access key from a receiving device, determining that the access key is valid, and providing access to the content item to the receiving device.

SPECIFICATION

Figure 1:
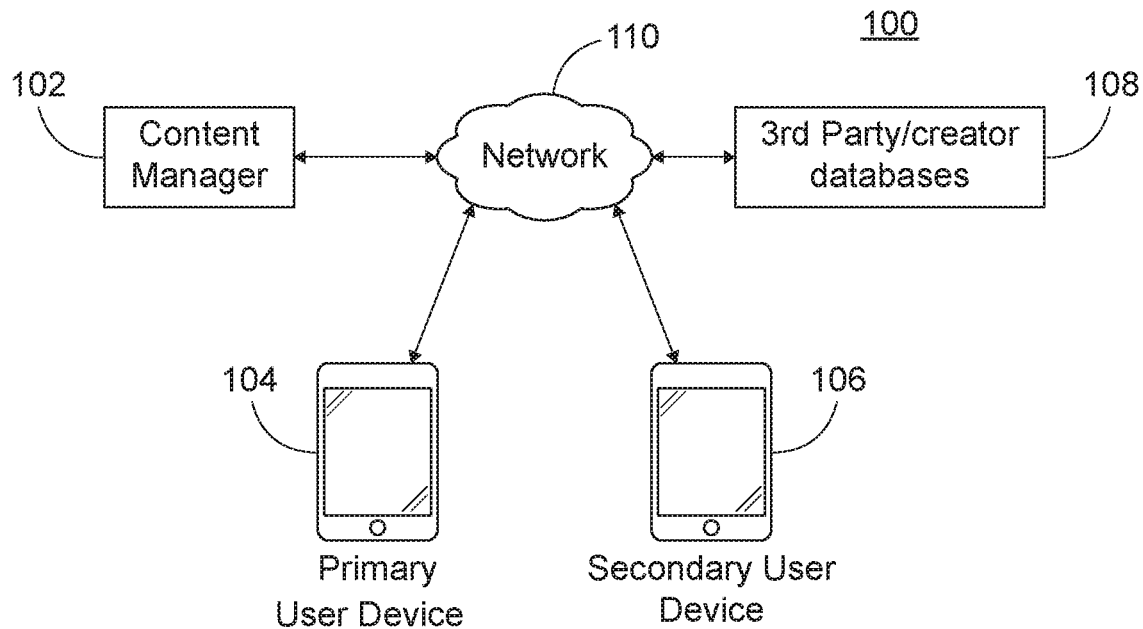
FIG. 1 illustrates a system for accessing content items by different user devices.

The present disclosure is related to a method and system for providing access to content, such as digital content, without requiring users to transmit access credentials with one another, as well as allow users better control over their content libraries and allowing access of content to others. In one example, a user can select a particular content item from his or her content library associated with a first user account to be accessed by another user device (e.g., a secondary or receiving device) and/or a second user account. Once the content item is selected, the system generates an access identifier (e.g., an access key) that identifies a particular content item in a content manager database as being temporarily accessible by other users. The access identifier may further include limitations or restrictions on the third party user access aspect of the content item, e.g., time limit to be accessed, time limit to be played after access, etc. The access identifier can then be used by a secondary device and/or second user account to access the content item (or a copy thereof) on a content manager database. The first user account has different user credentials (e.g., user name and password) than the first user account. In some instances, the first user account may be associated with a primary device, while the second user account may be associated with a secondary device. In other instances, the first user account and the second user account may be accessed on the same device (e.g., by logging out of one of the first user account or the second user account and logging in to the other of the first user account or the second user account). The access identifier may be a uniform resource link (URL) that directs or otherwise identifies the secondary device and/or the second user account to the content location on a database or server. The content manager or other server then can determine whether the content identifier is still valid (e.g., has not expired), and if valid, streams, delivers, or otherwise provides the content item to the secondary device and/or the second user account via a network.

The access identifier can be used to control access to the content item, helping to ensure that the content item is not passed on to multiple users (such as in daisy chain manner) and is accessed by only the approved users. For example, the access identifier may have a predetermined window to be "accepted" by a secondary user account in order to remain valid, and even after accepted or otherwise accessed, the access identifier may include further time restrictions, such that access to the content item may expire after a predetermined period of time.

With this system and method, the secondary user account can validly access the content item, without utilizing a first user account's access credentials. Additionally, a user associated with the first user account may still be able to access the content item for playback, even while a user associated with the second user account is viewing the content. In some examples, the user associated with the first user account and the user associated with the second user account may be different users. In other examples, the user associated with the first user account and the user associated with the same user account may be the same user. In some instances, the user associated with the first user account can select a particular content item to be accessed by the secondary device and/or second user account, without the user associated with the second user account having visibility to the full content library associated with the first user account. That is, the user associated with the first user account can selectively determine the content item(s) to which the second user account is allowed access, with the other content items in the content library associated with the first user account remaining inaccessible and even invisible to the user associated with the second user account. Relatedly, the user associated with the second user account can determine whether to accept the content item(s) or not. In some instances, the content identifier acts as a temporary entitlement for access to the content, allowing the second user account temporary authorized access the content item.

It should be noted that the systems and methods described herein are meant as merely technical options and should not be interpreted as any particular commercial application. The implementation of the various embodiments may be varied as desired based on particular content restrictions (e.g., copyright requirements) and limitations imposed by the content owners.

FIG. 1 illustrates a system 100 for accessing content across different or separate user accounts. The system 100 may include a content manager 102 (e.g., content database or server(s)), one or more content primary devices 104, one or more secondary devices 106, one or more third party devices, such as content creator databases 108, all of which may be connected directly or indirectly via a network 110.

The content manager 102 may be one or more computing devices that access a content database and host a content platform including information related to content items (e.g., movies, television shows, media, video games, audio content, video content, etc.). The content manager 102 may store copies of the content or may otherwise enable access to the content (e.g., through additional devices such as a content delivery network).

The primary device 104 and the secondary device 106 may be substantially any type of computing devices or other devices configured to receive and present content, as well as provide and receive input from a user. For example, the devices 104, 106 may be smart phones, tablet computers, desktop computers, televisions, set top boxes, computers, wearables, or the like. In one embodiment, the primary device 104 is one or more devices that holds a license right to a content item (e.g., has an entitlement, has a stored local copy, or other right that provides access to the content item) and the secondary device 106 is one or more devices that receive access to a content item authorized to the primary device. It should be noted that in many instances, permissions to access content, such as entitlements, license keys, digital rights management keys, etc. may be accessed across multiple separate devices or platforms and the discussion of any particular "device" accessing a content item is meant as illustrative only, and in some instances, the primary and secondary devices may be multiple devices, e.g., a user can first access a content item on a first device and finish playback on a second device. It should be noted that in some instances, the primary device and the secondary device may be the same hardware or computing device, but accessing the content manager 102 from different user accounts. In other words, in many instances, the primary and secondary devices may correspond to access by different user accounts, rather than specifically access by different computing hardware. As such, the description of primary and secondary devices is meant to encompass both instances where the hardware is in fact different and instances where the device itself may be the same, but the user account accessing the content is different. Similarly, although in some instances the terms first user account and second user account are used, the users associated with these accounts may not be different people, but rather be the same user tied to different user accounts that are used to access content on the system 100.

The third party servers or content creator databases 108 may be generally any type of computing device or server that may provide access to content items or otherwise manage parts of the system 100, separately from the user to user access. For example, certain content creators may generate access links for certain content items and then transmit these links or identifiers to all users or subsets of user.

The network 110 may include one or more communication mechanisms that allow the various components of the system 100 to communicate either directly or indirectly with one another. For example, the network 110 may include the Internet, WiFi, Bluetooth, and other radio frequency or electronic communication mechanism.

Figure 2:
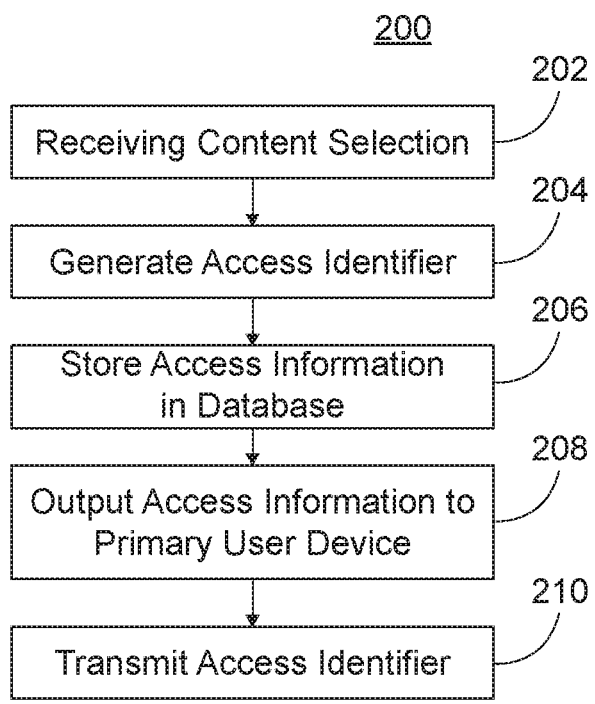
FIG. 2 illustrates a method to generate an active access link.

FIG. 2 illustrates a method 200 for allowing content items to be accessed across a first device and a second device, e.g., primary device and secondary or receiving device. The method 200 may begin with operation 202 in which the content manager 102 may receive a content selection from the primary device 104. For example, the user associated with the primary device 104 may select or otherwise indicate a particular content item within his or her entitled or accessible content selection to be accessed by the secondary device, where the secondary device does not have access (e.g., valid digital key) to the content item. In one embodiment, the user may scroll or search through his or her content library or selections on the primary device 104 and then tap or otherwise select an icon or other content identifier to indicate that the user would like to allow the secondary device 106 to access the selected content item.

In operation 204, an access identifier is generated for the content item. The access identifier may include identifying information for the particular content time (e.g., movie title, release date, content metadata, Entertainment Identifier Registry (EIDR), or the like), as well as access information (e.g., user account information, time access was initiated, window for viewing, window for accepting access, etc.) and content information (e.g., content metadata, title, release data etc.).). In one embodiment, the access identifier may include an entry in an access database describing the content item and the access information, as well as a separate transmitted item that can be used to reference the particular entry in the database. For example, the access identifier may include a URL or other link transmitted between user devices, where the URL directs the content manager 102 to a particular entry in its database or a separate access database that includes the information sufficient to allow the content manager 102 to determine whether identify the content item and decide whether to provide access to the content item. In another embodiment, the access identifier or content access key may be a barcode, matrix code, alphanumerical string, image, or any other type of data that can be encoded with information and transmitted to other users. In many instances, the link may be unique to identify not only a particular content item, but also correspond to a particular user account, and access transaction. In instances where a unique access identifier is used, the system 100 can better control the enabling of access to content, as well as provide user accounts with more availability to track their access transactions to other user accounts (allowing starting and stopping of access transactions for different user accounts as needed), and so on.

In operation 206, the access information is stored in the content manager 102 database, such as access database or portion of the content manager 102. As noted above, the access information stored may include an identification of the content item, an access identifier or ID, an originating user, an access user identification, an access window, a viewing window, as well as other information that may be needed by the system 100 to facilitate the temporarily entitlement to the secondary device 106, or to manage the content.

In operation 208, access information is output to the primary device 104. For example, the system 100 may transmit an access information webpage to the primary device 104 to allow the user to determine whether to move forward with the accessing process. This operation 208 may include an assessment of the user's account and status (e.g., available number of access transactions left), as well as whether a particular content item is available for accessing by other users in the future. In some instances, the system may also reduce a number of available accessing transactions, credits, tokens, or the like, available to a first user account (e.g., the user account) after the access identifier is generated and this information may be included in the access information output to the primary device 104.

In operation 210, the system 100 and in many instances the content manager 102, will transmit the access identifier to the primary device 104. For example, in one embodiment, the content manager 102 will transmit an access URL to the primary device 104, such as in the form of a loaded webpage on the primary device or within an application, a text message, an email, a push notification, or the like. The format of the transmission may vary based on different system implementations and/or user preferences, as well as the format of the access identifier. After the primary device 104 receives the access identifier, the user may then transmit the access identifier to other users, such as by transmitting the access identifier via the network 110 to the secondary device 106 (or another user device that disregards or does not activate the access link). The access identifier may be transmitted in various manners, including short messaging service (SMS), instant messaging, email, text messaging, push notification, etc. The format and type of transmission is variable depending on the communication structure between the user and secondary or receiving devices, the network 110, and the format of the access identifier.

Figure 3:
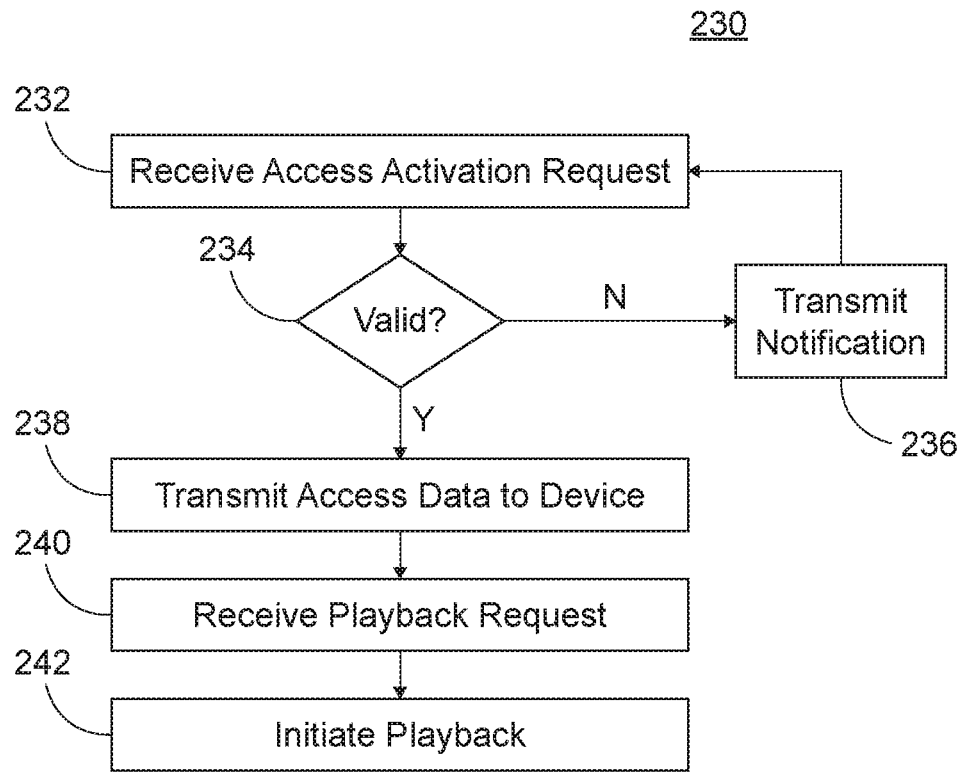
FIG. 3 illustrates a method to view accessed content.

The secondary device 106 may then use the access identifier to activate the access transaction and access the content. FIG. 3 illustrates a method 230 of utilizing the access identifier to provide access to a content item. With reference to FIG. 3, the method 230 includes operation 232 in which the content manager 102 or server receives the access activation request. For example, in instances where the access identifier is a URL, the secondary or receiving user can select or otherwise load the URL into an internet browser in the secondary device 106. The URL request will then include a call to the content manager 102 regarding the particulars of the access arrangement. As another example, in instances where the access identifier is a code or string, the access request may be received as the user inputs the code into a website or other input mechanism (e.g., application page or the like), that may be associated with the content manager 102. The code may then be provided directly or indirectly to the content manager 102.

In operation 234, the content manager 102 determines whether the access identifier is valid. For example, the content manager 102 may compare information corresponding to the access identifier against access information in an access database to determine whether the link corresponds to an active access request, whether the information in the access identifier is accurate, and so on. Continuing with this example, the content manager 102 may compare the access identifier to a list or other database of open or active access transactions and link identifiers, and if the link identifier does not reference, match, or otherwise correspond to an active access transaction, the content manager 102 may determine that the link is invalid. As another example, the content manager 102 may identify a corresponding entry in the access database, but determine that the active window for the content identifier has expired and determine that the link is invalid.

With reference to FIG. 3, in instances where the access request is determined to be invalid, the method 230 may include operation 236 and a notification may be transmitted to the requesting device, e.g., secondary device 106. The notification may include information related to the invalidation, such as access link not found, access transaction inactive, access expired, or the like.

In instances where the content identifier is determined to be valid, the method 300 proceeds to operation 238 in which access information may be transmitted to the secondary device 106. The access information may include, for example, images for the content (e.g., movie poster graphics), description of the content (e.g., summary, rating, length of time), and/or information related to the access time frame and access information (e.g., time remaining to access the content, number of views, etc.). Additionally, in some instances, the system 100 may include a login page or other access page for the secondary or receiving device to login into a content hosting or other platform. In these instances, the access information may include a "welcome" or other page that allows the user to enter credentials (if the user has credentials) for the platform or allow a user to create an account for the content platform.

In operation 240, the system may receive a playback or access request from the secondary device 106. For example, the access information may include a display of a "play" or "play now" type of icon or selection, which can be used to provide input to the content manager 102 that the secondary device 106 wants to access the content. The playback command may be provided to the content manager 102 in a variety of manners, depending on the type of device, the content, accessing method, and so on.

In operation 242, the content manager 102 initiates content access, playback or content delivery to the secondary device 106, such as in response to the playback request. In many embodiments, the content item may be streamed or otherwise delivered to the secondary device 106. In instances where the content item is streamed, data corresponding to the content item (e.g., one stored and delivered via a CDN), may be transmitted to the secondary device 106 and may be transmitted over the network 110 (e.g., in one or more packets). In these instances, the secondary device 106 does not retain a local copy of the content item after it has been viewed, which may be helpful in maintaining content control. The delivery or playback initiation may vary as desired.

Figure 4:
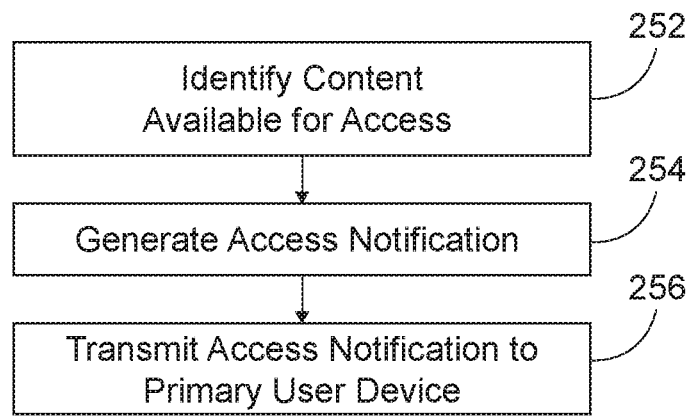
FIG. 4 illustrates a method to distinguish accessible content items.

In some instances, the system 100 may identify content items that are able to be accessed by other users, e.g., accessing or secondary users. For example, certain content creators and/or content owners may place "non-access" or other access restrictions on content and so by identifying content items without such restrictions a user can more easily identify those that can be accessed by other users. FIG. 4 illustrates a method 250 for indicating content items available for access transactions. In operation 252, the system 100, such as the content manager 102, may identify content items that are available for access transactions to other user devices. For example, the content manager 102 may analyze metadata corresponding to content items and their licensing/distribution limitations to determine whether access transactions are permitted. As another example, content items with access restrictions may be stored in a separate database from those without such restrictions.

In operation 254, the system 100 may generate an "available to access" type of notification for a user. For example, an access icon may be generated that indicates to the user that the content item is available to be accessed by other users. As another example, the access availability may be presented to the user in the form of a change of color, text type, size, or the like, for the content item as displayed in a content library of the primary device 104. In operation 256, the access icon or other notification is transmitted to the primary device 104 and displayed with or adjacent to the content item display in the account of the primary device 104.

In the various methods 200, 230, 250 and use of the system 100, it should be noted that the secondary device does not have full access to the content library associated with the primary device. For example, the user associated with the secondary device and/or second user account cannot browse all available titles in the content library associated with the primary device and/or first user account. Rather, the user associated with the secondary device and/or second user account can only view select titles that have been designated by the primary device as being available to be accessed by others. Further, even if a second user account has an active access transaction corresponding to a particular content item (e.g., Movie 1), the first user account can still access and view that same content item (e.g., watch Movie 1 on the primary device), such that the system 100 allows for simultaneous co-viewing experiences of the same content item by both the first and second user accounts.

Figure 5:
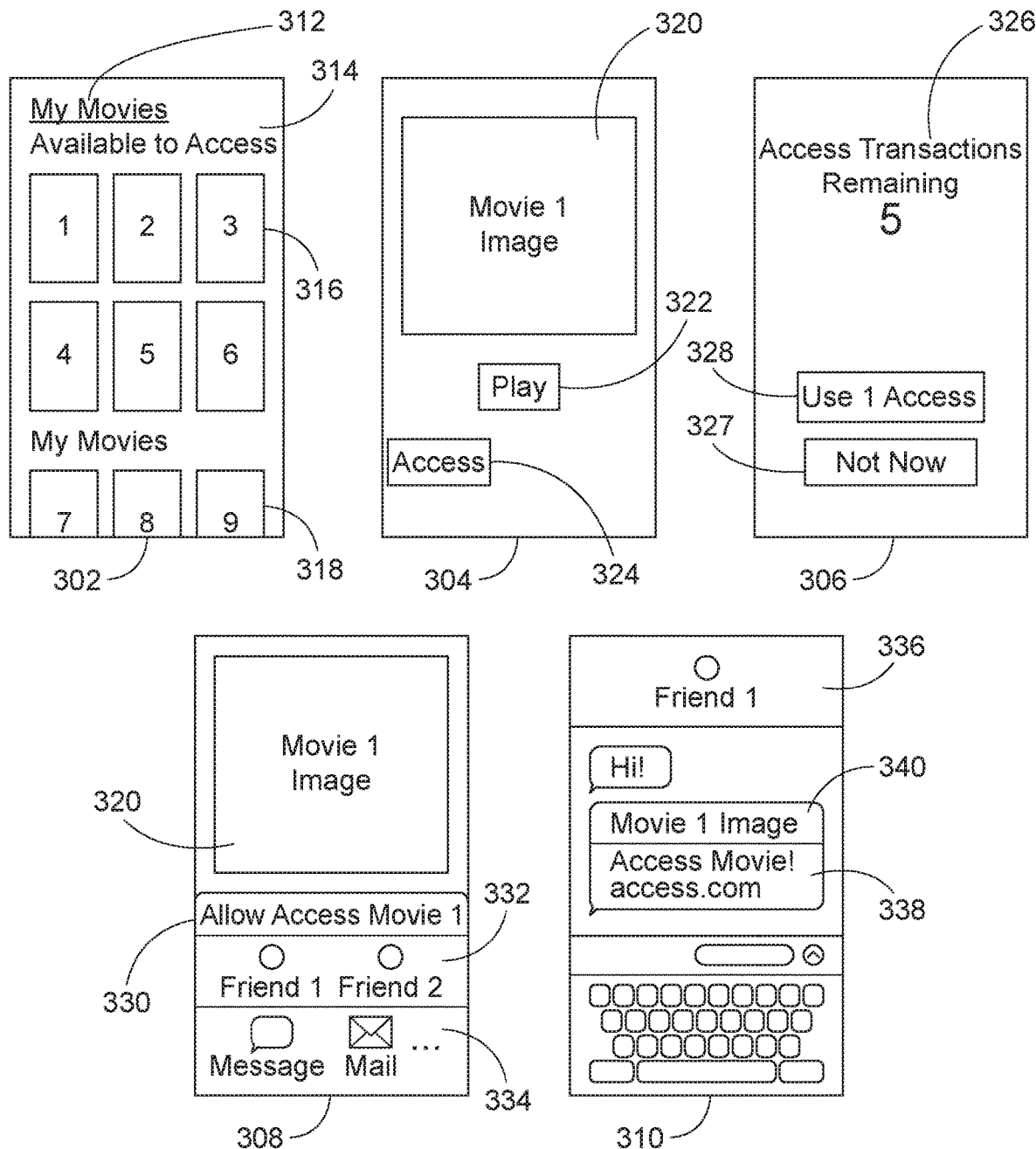
FIG. 5 illustrates an example flow of interfaces to initiating accessing of a content item.

FIG. 5 illustrates examples of a user interface that may be displayed on the primary device 104 during various functions of the system 100. The examples shown in FIG. 5 are shown with respect to movies, but it should be understood that these user interfaces may be applicable to any type of digital content and are meant as illustrative only. With reference to FIG. 5, the system 100 may include a content account interface 302 that displays various content items available to a particular primary device 104 (e.g., those accessible by a particular user account within the platform). In some instances, the content account interface 302 may include content type heading 312, e.g., "My Movies", with content items 316, 318 broken into two categories, "Available for Access Transactions" 314 and others 316. In this example, the access notification (such as the described in operation 254) is displayed as a heading over a list of items.

From the library interface 302, the user can select a particular content item in the "Available for Access Transactions" 314 category. The content selection may generate an access transaction selection interface 304, which may include content information 320, such as a representative content image, description of the content, or the like. The access transaction selection interface 304 may also include a playback input 322, such as an icon, button, or selectable graphic that a user can select to activate playback or delivery of the content item, and an access input 324, such as an icon, button, or selectable graphic. The access input 324 may be selected by the user in order to initiate an access transaction to a secondary device 106.

When the access input 324 is selected, the system 100 may generate an activate access interface 306. The activate access interface 306 may include user access information 326, such as number of access transactions remaining for a particular user account (if limited by the system or content creator), as well as a use access input 328 and/or a decline input 327. The access input 328 may be in the form of an icon, button, or selectable graphic, and may include information related to the number of credits or access transactions that may be required for the particular content item. For example, access to certain content items may be "free" to send to others, while others may require an access credit, or other payment or cost. By including the cost, if any, of the access transaction within the access indication interface, the user can easily make an informed decision about whether to activate the access transaction. Similarly, the decline input 327 may be in the form of an icon, selectable graphic, or the like, and may be used to exit out of the access transactions page, return to the previous page, or other action that does not activate an access transaction.

When the user activates the access transaction, such as by selecting the access input 328, the system 100 may generate a communication interface 330. The communication interface 330 allows the user to select a contact (e.g., email address, phone number, username, device or the like) to send the access identifier to. As one example, the communication interface 330 may include a contact selection interface 332 where a user can select a particular contact or delivery address, as well as a transmission format interface 334 where the user can select the format for the transmission (e.g., SMS, email, device to device communication, or the like). It should be noted that the communication interface 330 may depend on the type of device and hardware, e.g., a set top box or desktop computer may open a new window or display the transmission and contact options differently.

Once a contact or address is selected, as well as a transmission format, the system 100 (e.g., content manager or in some instances the primary device itself) may generate a transmission interface 310. The transmission interface 310 may include a contact identifier 336 (e.g., person's name), communication area, with communication transcripts or entries. As shown in FIG. 5, the transmission interface 310 may include a communication of the access identifier 338, which in this example is a URL, along with content information 340 (e.g., movie image or description) able to be transmitted to a particular content or address.

Figure 6:
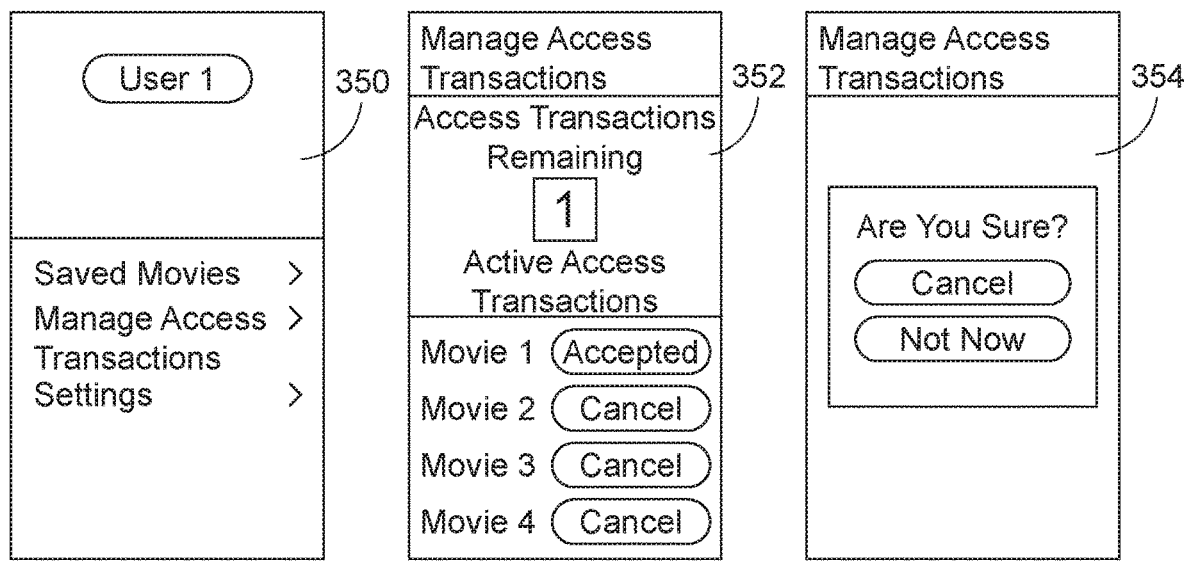
FIG. 6 illustrates an example flow of interfaces for managing access of content items.

As mentioned above, in some instances, the system 100 may allow users to manage or track access transactions. FIG. 6 illustrates exemplary graphical user interfaces that may be generated by the system 100 (e.g., by the content manager 102) to allow a user access to and control over accessed items. As with FIG. 5, although FIG. 6 is shown with respect to movies, it should be understood that the interfaces may be applicable to any type of digital content accessed with the system 100 and the description of any particular implementation is meant as illustrative only. With reference to FIG. 6, in some instances, the content manager 102 may include a settings or account interface 350, where a user can adjust settings, change information, or the like. In this example, the account interface 350 includes a "manage access transactions" category or selection that the user can select. When selected, a manage access transactions interface 352 may be generated that includes a number of credits or access transactions remaining (if limited), as well as optionally a list of the status of active transactions providing other user devices access to content items. The list may include a content description (e.g., title), as well as status information, e.g., whether the access transaction has been accepted by the secondary or receiving devices (other user devices). In various implementations, the status information may include an access time left for the secondary user to accept the access transaction, a time left to view the content item, and/or a time left for the content entitlement itself. In some instances, the user may be able to select to cancel an access transaction if a receiving user has not yet activated the access, which may be important in instances where each access event may include a cost, such as credits, or the like, and cancelling an access transaction can result in the credits not being used or a fraction of the credits being used. In instances where a user may select to cancel a transaction, a cancellation interface 354 may be displayed where a confirmation icon may be displayed to confirm that the user does wish to cancel the access transaction.

Figure 7:
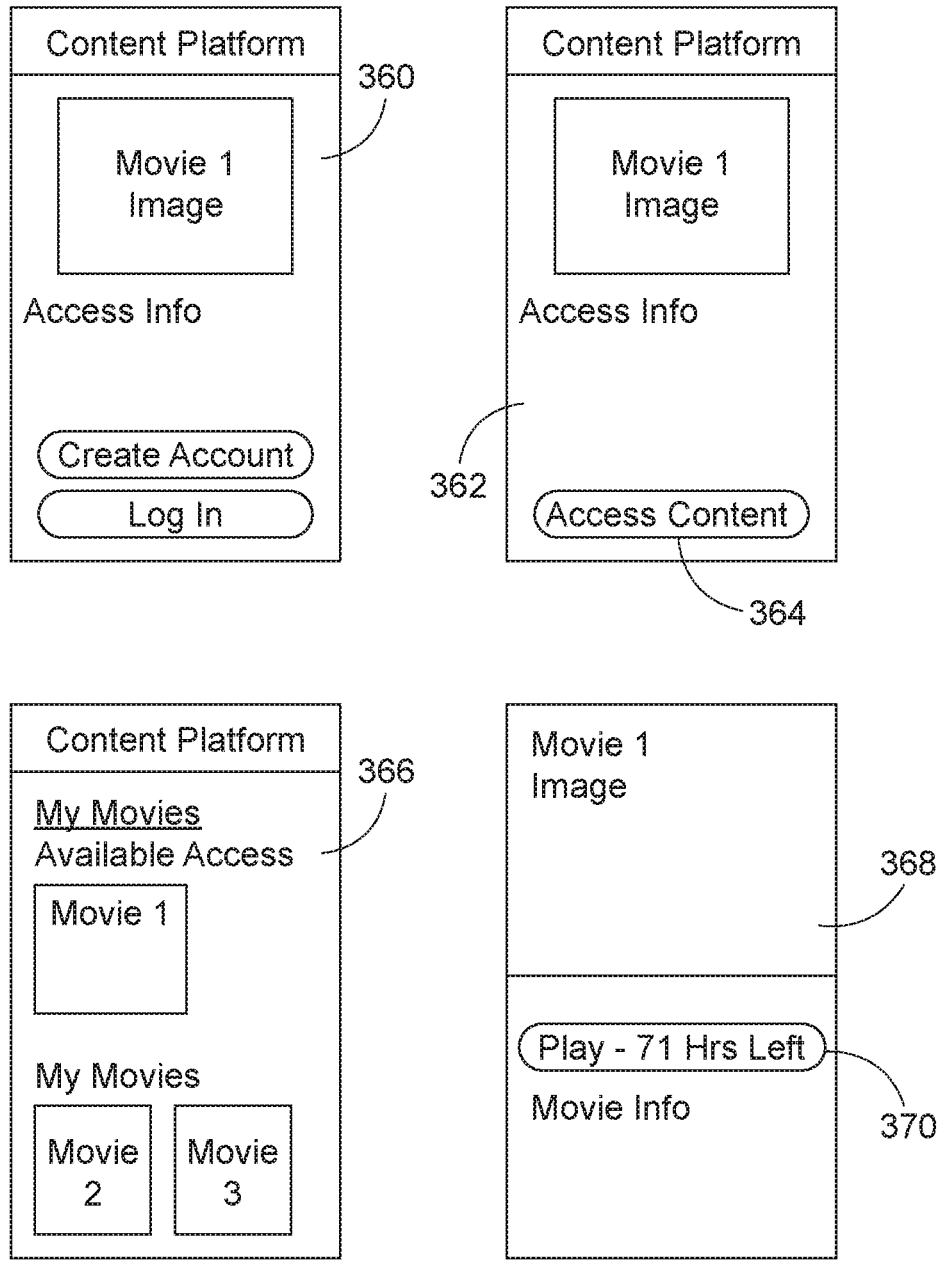
FIG. 7 illustrates an example flow of interfaces for accessing another user's content item.

FIG. 7 illustrates examples of interfaces that may be generated for the secondary device 106 when selecting an access identifier. It should be noted that the examples in FIG. 7 are shown with respect to movies, but it should be understood that the interfaces may be used with any type of digital content and are meant as illustrative only. For example, after the secondary device 106 receives the access identifier (e.g., in interface 310) and selects the access identifier or otherwise provides the access identifier to the system 100, an initial interface 360 may be transmitted to the secondary device 106. In some embodiments, the system 100 may require that accessing or secondary users also have accounts with the content manager 102 to help ensure that an accessed content item is not distributed outside of the system environment, and in these instances, may transmit a user account creation page to the secondary device 106. In other embodiments, the system 100 may not require the secondary device 106 to have an account on the content manager 102, but may, for example, still require that the secondary device 106 to access the content through the platform, e.g., as a visitor or temporary user.

After an accessing user has provided credentials, a content information interface 362 is displayed. The content interface 362 may include information related to both the content item and the access transaction, e.g., movie artwork, description, access window, viewing time frame, or the like. The content interface 362 may also include an access content input 364 in the form of an icon, button, or selectable graphic, which can be selected by the user to access the content item. In some instances, selection of the access content input 364 may result in the content item being immediately streamed or otherwise provided to the secondary device 106 for playback. In other instances, the access content input 364 will act to add the content item to the accessing user's full content selection or listing. As one example, the system 100 may generate a library interface 366 where the content item information is displayed with other content items corresponding to the user account.

From the library interface 366, the user can select a content item, and then an initiating playback interface 368 may be generated. The initiating playback interface 368 may include a play input 370 in the form of an icon, button, or selectable graphic, where the user can start accessing the content item, which may also include information corresponding to the content and the access activity (e.g., time frame remaining on access transaction).

It should be noted that the various graphical user interfaces shown in FIGS. 5-7 are meant as illustrative only and may be varied depending on the devices, content manager, and the like.

Figure 8:
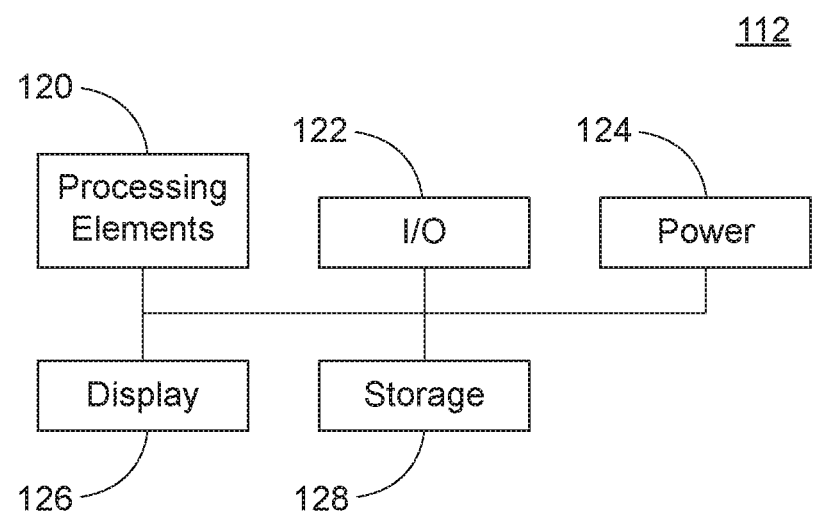
FIG. 8 illustrates a simplified block diagram of a computing device for use with the systems and methods herein.

Various components of the system 100 may include or be hosted on a computing device. For example, the content manager 102 and third party databases 108 may include one or more servers or computing elements. Similarly, the primary device 104 and the secondary device 106 may be computing devices as well. FIG. 8 illustrates a simplified block diagram of a computing device for use with the system 100. The computing device 112 may include one or more processing elements 120, an input/output interface 122, a power source 124, a display 126, as well as one or more storage components 128, all of which can be connected together directly or indirectly via one or more system busses, wireless data communication mechanisms, and/or wired connections.

The processing element 120 or processor is substantially any electronic device capable of processing, receiving, and/or transmitting instructions, including a graphics processing unit, central processing unit, server, processor, or the like.

The storage 128 or memory stores electronic data used by the processor 120, such as instructions to execute certain instructions, or the like. The memory 128 may store electrical data or content, such as, but not limited to, audio files, video files, document files, and the like. The memory 128 may be, for example, magneto-optical storage, read only memory, random access memory, erasable programmable memory, flash memory, or a combination of one or more types of memory components, or computer readable medium. The memory 128 may include data or instructions that can be executed by one or more processors.

The display 126 is any type of device that can display images, such as a liquid crystal display, organic light emitting diode display, plasma display, or the like. When connected to the user and user devices, the display 126 may be configured to display content, such as images or videos. The display 126 may be incorporated into a user device (e.g., tablet, smartphone, or the like), and/or a computational display to present content items to the user.

The input/output interface 122 provides communication to and from the computer 112 and various other components. The input/output interface 122 can include one or more input buttons, capacitive touch screen, keyboard, mouse, pedal, stylus, hotkey, button, joystick, or the like, a communication interface, such as WiFi, Ethernet, or the like, as well as other communication components such as universal serial bus (USB) cables, or the like. The power source 124 may be a battery, power cord, or other element configured to transmit power to the components of the projectors.

The methods and systems are described herein with reference to generating transitory or temporary content licenses. However, these techniques are equally applicable to other types of content accessibility transactions. Additionally, although the discussions presented herein are discussed with respect to particular user interfaces and the operational steps, the interfaces and steps are variable and optional. The system and methods described herein allow content items to be easily and readily accessed by multiple users, even simultaneously, to allow for dual viewing experiences, but based on one user's authorized access to the content. Because the content items may be streamed from a content database, rather than accessed from a user's local memory, the system can better maintain control (even over secondary user access), as well as quality control, and the like.

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method for accessing content comprising:
    presenting, via a user interface at a primary device, a content item and a number of access credits remaining for the content item, wherein the content item is accessible by the primary device associated with a primary user, wherein the primary user has access to stream the content item from a content database, wherein the primary user has the ability to allow a secondary user to access and stream the content item, wherein the content item is exclusively managed by one or more third parties separate from the primary user and the secondary user;
    receiving, via the user interface, an access activation request from the primary user associated with the primary device corresponding to the content item;
    generating an access identifier corresponding to the content item, wherein the access identifier identifies the content item and includes access information, wherein the access information includes a temporal access window, wherein the access identifier is valid during the temporal access window;
    receiving an access request including the access identifier from the secondary user on a secondary device;
    determining that the access identifier is valid;
    providing access to the content item to the secondary device by providing the secondary user with access to stream the content item from the content database;
    reducing the number of access credits for the content item; and
    presenting, via the user interface, a status of the access request and the reduced number of access credits.

2. The method of claim 1, further comprising storing the access identifier in the content database, wherein the access identifier identifies the content item and the primary device.

3. The method of claim 1, wherein the access identifier is a uniform resource link.

4. The method of claim 1, further comprising transmitting the status corresponding to the access identifier and active access transactions to the primary device, wherein transmitting the status occurs after generating the access identifier.

5. The method of claim 1, wherein the primary device and the secondary device comprise the same hardware.

6. A method for providing access to content comprising:
    presenting, via a user interface at a primary device, a content item and a number of access credits remaining for the content item, wherein the content item is accessible by a primary device associated with a primary user, wherein the primary user has access to stream the content item from a content database, wherein the primary user has the ability to allow a secondary user to access and stream the content item, wherein the content item is exclusively managed by one or more third parties separate from the primary user and the secondary user;
    receiving, via the user interface, an access activation request from the primary user at the primary device for the content item including an access identifier;
    comparing the access identifier to a database of active content access transactions to determine that the access identifier is valid and the access activation request is received at a time within a temporal access window associated with the access identifier;
    transmitting access information corresponding to the content item and the access identifier to the secondary user;
    receiving a playback request from a secondary device associated with the secondary user based on the access data and the access identifier;
    providing access to the content item to the secondary device by providing the secondary user with access to stream the content item from the content database;
    reducing the number of access credits for the content item; and
    presenting, via the user interface, a status of the access request and the reduced number of access credits.

7. The method of claim 6, wherein the access information includes at least one of a content description or an access time left for a valid access identifier.

8. The method of claim 6, wherein the access identifier is a uniform resource link.

9. The method of claim 6, wherein the content identifier is generated based on an access request received from the secondary device, wherein the content item is not accessible by the secondary device without the access identifier requested by the primary device.

10. A non-transitory computer readable medium including instructions that when executed by at least one processor of a computing system cause the computing system to perform a method comprising:
    presenting, via a user interface at a primary device, a content item and a number of access credits remaining for the content item, wherein the content item is accessible by the primary device associated with a first user, wherein the first user has access to stream the content item from a content database, wherein the first user has the ability to allow a second user to access and stream the content item, wherein the content item is exclusively managed by one or more third parties separate from the first user and the second user;
    Receiving, via the user interface, an access activation request from the first user associated with the primary device for a content platform and the content item;
    generating an access key corresponding to the content item based on the first user authorized access to the content item, wherein the access key identifies the content item and a temporal access window for accessing the content item by the receiving device;
    transmitting the access key corresponding to the content item to the receiving device;
    receiving an access request from the receiving device including the access key from the receiving device;
    determining that the access key is valid;
    providing access to stream the content item from the content database to the receiving device;
    reducing the number of access credits for the content item; and presenting, via the user interface, a status of the access request and the reduced number of access credits.

11. The non-transitory computer readable medium of claim 10, wherein when the access request is received, the receiving device is not associated with a user account for the content platform.

12. The non-transitory computer readable medium of claim 11, wherein the method further comprises:
- transmitting a user account creation page to the receiving device; and
- receiving login credentials from the receiving device to initiate a user account associated with the second user;
- wherein transmitting the user account creation page and receiving login credentials occurs after the access request is received.

13. The non-transitory computer readable medium of claim 10, wherein the access key is a uniform resource link identifying the content item for accessing the content item by another user account.

14. The non-transitory computer readable medium of claim 10, wherein the access activation request is generated in response to the first user requesting that the content item be accessed by the second user.

15. The method of claim 1, wherein the secondary user retains access to the content item at the secondary device for a duration of an access time frame after the co-viewing experience.

16. The method of claim 6, wherein the secondary user retains access to the content item at the secondary device for a duration of an access time frame after the co-viewing experience.

17. The non-transitory computer readable medium of claim 10, wherein the second user retains access to the content item at the receiving device for a duration of an access time frame after the co-viewing experience.

18. The method of claim 1, wherein the content item is video content.

* * * * *